May 20, 1952  E. L. SHERMAN  2,597,601

FISHERMAN'S HATBAND

Filed Aug. 23, 1948

Earl L. Sherman
INVENTOR.

BY

Patented May 20, 1952

2,597,601

UNITED STATES PATENT OFFICE 2,597,601

FISHERMAN'S HATBAND

Earl L. Sherman, Eugene, Oreg., assignor of forty-nine per cent to Harry W. Bacon, Eugene, Oreg.

Application August 23, 1948, Serial No. 45,593

1 Claim. (Cl. 2—179)

This invention relates to new and useful improvements and structural refinements in devices for carrying fish lures, fish hooks, and the like. It is the conventional practice among fishermen to carry such fish lures and hooks by embedding the hook portion thereof into their hat, so that an appropriate lure or hook may be selected when required. Needless to say, as a result of this practice the hat sustains considerable damage, and in addition, considerable difficulty is usually experienced in extracting the fish hook from the hat, so that any convenience such as may be enjoyed by having an imposing array of lures and hooks on one's hat is fully overshadowed by the inconvenience of removing or separating such fish lures from the hat and by the damage to which the hat itself is subjected.

It is, therefore, the principal object of the instant invention to preserve the traditional practice of applying or storing fish lures and hooks on a hat, but at the same time, to facilitate the application and removal of the fish lures and hooks in a highly expeditious manner and without injury to the hat itself.

This object is achieved by the provision of what may be referred to as a hat band equipped with a plurality of permanent magnets, these magnets being intended to attract and retain metallic fish lures and hooks in position on the hat band without the latter actually being penetrated or otherwise damaged thereby.

An important advantage of the invention resides in its simplicity of construction, in its pleasing appearance and in its adaptability for use with hats of different sizes and types.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
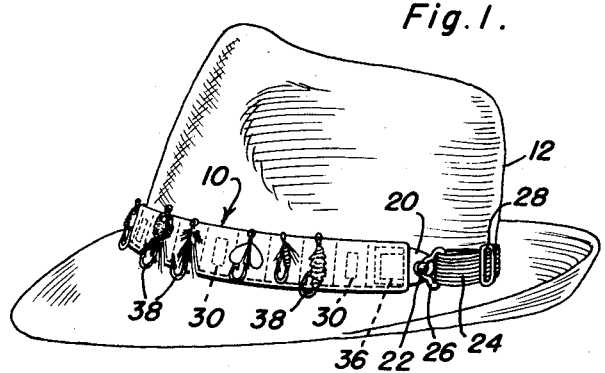
Figure 1 is a perspective view of the invention in position on a hat and carrying a plurality of fish lures.
Figure 2:
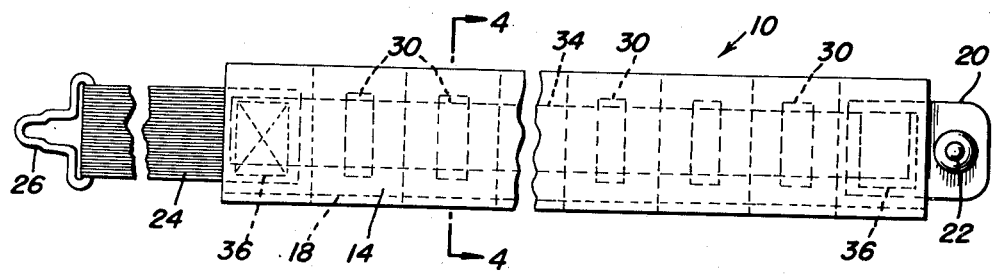
Figure 2 is a developed plan view of the invention per se.

Referring now to the accompanying drawings in detail, the invention consists of a hat band designated generally by the reference character 10, intended for use in association with a conventional hat 12, the band 10 embodying in its construction a sheet of flexible and preferably waterproof material which is doubled upon itself longitudinally so as to provide outer and inner panels 14, 16 respectively, which are secured together at their free longitudinal edges by stitching, or the like, as indicated at 18.

One end portion of the band 10 is provided with an extension 20 carrying a fastener 22, while the remaining end portion of the band is equipped with a resilient strap 24 carrying a coacting fastener 26 which is separably engageable with the aforementioned fastener 22. It will be apparent that in this manner the hat band will be effectively retained in position on the hat and moreover, by virtue of the resiliency of the strap 24, the hat band will accommodate hats of various sizes. If desired, a suitable adjusting buckle 28 may be provided on the strap 24, as will be clearly apparent. (See Figure 1.)

Figure 3:
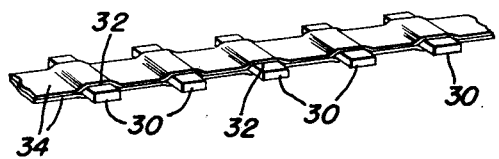
Figure 3 is a fragmentary perspective view of the magnet retainer and magnets used in the invention.
Figure 4:
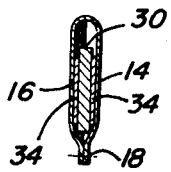
Figure 4 is a cross sectional view, taken substantially on the plane of the line 4—4 in Figure 2.

The essence of novelty in the invention resides in the provision of a row of substantially flat permanent magnets 30 between the outer and inner panels 14, 16 of the hat band, these magnets preferably being retained in position in suitable pockets 32 formed in a pair of juxtaposed strips 34, as is best shown in Figure 3.

The strips 34 may be secured together in any suitable manner, such as for example, by adhesive, or the like, and after the strips 34, together with the magnets 30, are interposed between the panels 14, 16, the end portions of the strips may be secured in position between the panels by stitching, as indicated at 36, or in any other suitable manner.

When the invention is placed in use, the band 10, as a whole, is simply applied circumferentially to the hat 12 as shown in Figure 1, whereupon metallic fish lures, fish hooks, etc. indicated at 38, may be applied to the band, being retained in position by the attraction of the magnets 30, as will be clearly understood.

It is to be noted that the fish lures, etc., will be firmly retained in position, but removal thereof will be facilitated. Moreover, neither the hat nor the hat band will suffer damage, such as was usually sustained when the fish hooks were secured in position by penetrating the material of the hat or band, in accordance with conventional practice.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

The combination of a flexible band, a tab provided at one end and an elastic member provided at the other end of said band, coacting fastener means on said tab and on said member whereby the same may be separably connected together, said band comprising a strip of material doubled longitudinally upon itself to provide inner and outer walls, a line of stitching securing together the free longitudinal edge portions of said walls, a pair of superposed flexible straps extending longitudinally in said band between the inner and outer walls thereof, stitching securing end portions of said straps to the band, said straps having longitudinally spaced portions thereof secured together whereby the spaces between the secured portions provide a plurality of transversely extending pockets open at both longitudinal edges of the straps, and a plurality of rigid magnetic bars positioned in the respective pockets and projecting beyond the longitudinal edges of said straps.

EARL L. SHERMAN.

REFERENCES CITED

The following references are of record in the file of this patent:

UNITED STATES PATENTS

| Number | Name | Date |
|---|---|---|
| 429,778 | Shelby | June 10, 1890 |
| 725,524 | Wetmore | Apr. 14, 1903 |
| 1,133,542 | Deal | Mar. 30, 1915 |
| 1,459,750 | Schreiber | June 26, 1923 |
| 1,558,228 | Botkin | Oct. 20, 1925 |
| 1,677,919 | Hansen | July 24, 1928 |
| 1,993,144 | Kasdan | Mar. 5, 1935 |
| 2,084,174 | Young | June 15, 1937 |
| 2,222,096 | Walthour, Jr. | Nov. 19, 1940 |